United States Patent [19]

Miyamoto et al.

[11] Patent Number: 5,093,056
[45] Date of Patent: Mar. 3, 1992

[54] HIGH STRENGTH SI₃N₄ COMPOSITE CONTAINING SIC WHISKERS AND METHOD OF PRODUCING THE SAME

[75] Inventors: Yoshinari Miyamoto, 1-8-37, Midoridai, Kawanishi-shi, Hyogo; Mitsue Koizumi, 3-6-22, Tamaicho, Toyonaka-shi, Osaka; Hiroyuki Takemura, Toyama, all of Japan

[73] Assignees: Yoshida Kogyo K. K.; Yoshinari Miyamoto; Mitsue Koizumi, Japan; a part interest

[21] Appl. No.: 439,003

[22] Filed: Nov. 21, 1989

Related U.S. Application Data

[63] Continuation of Ser. No. 183,980, Apr. 20, 1988, abandoned.

[30] Foreign Application Priority Data

Apr. 22, 1987 [JP] Japan ................................ 62-97452

[51] Int. Cl.⁵ ...................... C04B 14/32; C04B 14/38
[52] U.S. Cl. .......................................... 264/62; 264/65; 501/92

[58] Field of Search .................. 264/570, 65, 62; 501/92, 95

[56] References Cited

U.S. PATENT DOCUMENTS 3,833,389  9/1974  Komeya et al. ..................... 501/92

FOREIGN PATENT DOCUMENTS 1184573  3/1985  Canada ................................. 501/92
WO86/05480  9/1986  PCT Int'l Appl. .

Primary Examiner—James Derrington
Attorney, Agent, or Firm—Hill, Van Santen, Steadman & Simpson

[57] ABSTRACT

A high strength $Si_3N_4$ composite composed of a sintered body consisting mainlyu of $Si_3N_4$ in which SiC whiskers with a small aspect ratio, preferably an average aspect ratio of 15 to 100, is contained in the sintered body and thereby a considerable improvements can be obtained in the mechanical properties, such as strength, toughness and mechanical shock resistance. The composite is produced by mixing the SiC whiskers with $Si_3N_4$ powder and then sintering the resulting mixture by a hot isostatic pressing without using a sintering aid.

1 Claim, 1 Drawing Sheet

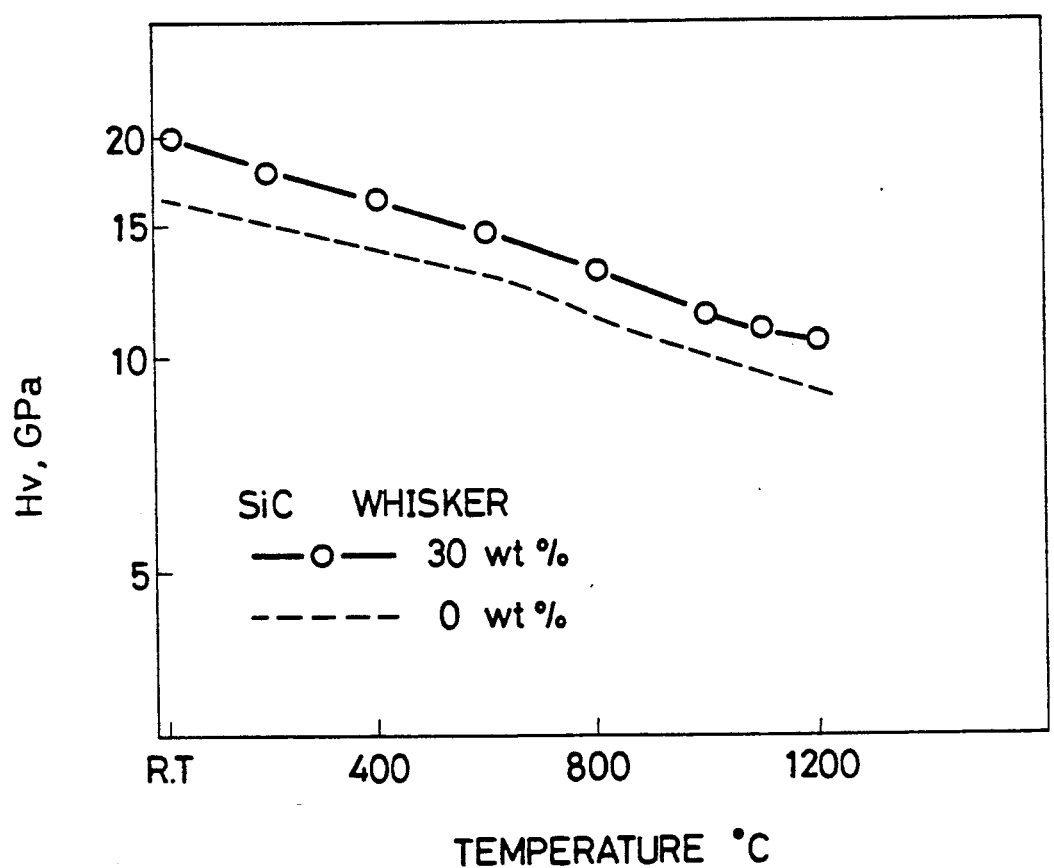

HIGH STRENGTH Si₃N₄ COMPOSITE CONTAINING SiC WHISKERS AND METHOD OF PRODUCING THE SAME

This is a continuation of application Ser. No. 183,980, filed Apr. 20, 1988, now abandoned.

BACKGROUND OF THE INVENTION

1. Field of the Invention

The present invention relates to a high strength ceramic composite composed mainly of $Si_3N_4$ and containing SiC whiskers and a method of producing the same.

2. Description of the Prior Art

There is a great difficulty to obtain sintered bodies of $Si_3N_4$ having a high density when $Si_3N_4$ is used alone. This is due to the fact that constitute atoms of $Si_3N_4$ have a small self-diffusion coefficient and $Si_3N_4$ has strong covalent properties. Usually, a sintering aid such as MgO, $Y_2O_3$ or $Al_2O_3$ has been added to obtain high density sintered bodies. However, in such a case, the sintering aid precipitates as a glass phase along grain boundaries and many problems, such as deterioration of hardness and strength, has arisen in a high temperature range of 1000° C. or higher due to the softening of the glass phase.

In order to improve high temperature properties, various ways of achieving sintered bodies of high density have been studied without adding a sintering aid.

For example, Shimada, et al. reported in Yogyo Kyokai-shi, Vol. 89, No. 4, pp. 197 to 203 (1981) that sintered bodies having a relative density of 99% or higher can be obtained by a superhigh pressure sintering process. Also, such high density sintered bodies have been reported by Honma, et al., in Yogyo Kyokai-shi, Vol. 95, No.2, pp. 229 to 234 (1987) and Nezuka, et al., in Digest of 25th Basic Ceramic Symposium, pp 29 (1987) in which a hot isostatic pressing (HIP) is employed. According to these reports, it has been found that the sintering aid-free $Si_3N_4$ sintered bodies are not subject to deterioration of their properties at high temperatures. However, the $Si_3N_4$ sintered bodies without the addition of sintering aids are disadvantageous in that their strength and toughness are both low. In $Si_3N_4$ sintered bodies containing a sintering aid, $\beta$-$Si_3N_4$ grows as needle-like grains and the grains thus grown tangled together, thereby resulting in sintered bodies having a high strength and a high toughness. In contrast to this, in the case of sintered bodies without addition of sintering aids, $\beta$-$Si_3N_4$ grows as a granular form and needle-like grains are not formed. Consequently, strength and toughness are reduced.

SUMMARY OF THE INVENTION

The present invention has been made with the object of eliminating the foregoing disadvantages encountered in the $Si_3N_4$ sintered bodies free of sintering aids.

It is therefore an object of the present invention to provide a sintered body of $Si_3N_4$ having a high strength and a high toughness.

Another object of the present invention is to provide a method of producing such a sintered body of $Si_3N_4$.

According to a first feature of the present invention, there is provided a high strength $Si_3N_4$ composite composed of a sintered body consisting mainly of $Si_3N_4$, the sintered body containing SiC whiskers with a small aspect ratio.

A further feature of the present invention resides in a method of producing the high strength $Si_3N_4$ composite containing SiC whiskers, the method comprising mixing SiC whiskers having a small aspect ratio with $Si_3N_4$ powder and then sintering the resulting mixture by a hot isostatic pressing without using a sintering aid.

Owing to the addition of the SiC whiskers, the $Si_3N_4$ sintered composite of the present invention has considerably high strength and toughness as compared to prior art composite and exhibits a high resistance to mechanical shock. Further, according to the method of the present invention, there can be readily obtained a sintering aid-free $Si_3N_4$ sintered body exhibiting a high strength at high temperatures. Therefore, the present invention can provide a quite novel composite which is highly useful, especially as a structural ceramic material.

BRIEF DESCRIPTION OF THE DRAWING

The single FIGURE is a graph showing the high-temperature characteristics of hardness for a sintered body of an example according to the present invention and a comparative sintered body.

DETAILED DESCRIPTION OF THE PREFERRED EMBODIMENTS

SiC whiskers used in the present invention have a small aspect ratio and the reason for this is as follows. In the sintered body, a stress field is generated due to the difference in thermal expansion between the whiskers and the matrix at boundaries therebetween and it is assumed that greater strain energy will be accumulated around whiskers having a larger diameter. On the other hand, with respect to the mechanism of improving the toughness of the $Si_3N_4$ ceramics containing dispersed SiC whiskers, it is considered that scattering and absorption of strain energy occur at the front of cracking due to suppression of cracking by the whiskers and due to curving, twisting and branching of cracks which may be caused by preferential propagation of cracks to the boundaries between the whisker and the matrix. Therefore, considering such effects, whiskers having a greater diameter which permit accumulation of large strain energy are desirable. In examples described hereinafter, whiskers having a diameter of 0.1 to 1.0 µm were employed but whiskers with a diameter in the range of 0.05 to 10 µm may be also used depending on the particle diameter of the matrix. Whiskers having a large length are undesirable from the viewpoint of strength because they are hard to uniformly disperse and tend to form an aggregation which leads to distruction. In order to achieve an increased mechanical strength, the length of the whiskers is preferably a few times the particle diameter of the matrix. In examples described below, SiC whiskers with a length of 10 to 50 µm were employed and good results could be obtained. Depending on the particle diameter of the matrix, whiskers having a length of the order of about 0.5 to 500 µm may be also used. Therefore, it is essential that whiskers used in the present invention have a small aspect ratio and a preferable aspect ratio is on the order of about 15 to 100. The amount of the addition of the whiskers of SiC is effectively at least 5% by weight of the sum of $Si_3N_4$ and the whiskers and addition of 30% by weight results in considerably improved strength and toughness. However, an addition of SiC whiskers exceeding 40% by weight makes it difficult to obtain sintered bodies with whiskers isotropically oriented and, thus, such an addition is unfavorable. Therefore, the SiC whiskers are preferably added in amounts of 5 to 40% by weight of the sum of $Si_3N_4$ and the SiC whiskers.

In the production of the $Si_3N_4$ sintered bodies of the present invention, $Si_3N_4$ as a main component can not be readily densified due to poor sinterability thereof when $Si_3N_4$ powder is used alone and SiC whiskers inhibit sintering. However, when sintering is performed using a hot isostatic pressing (HIP), there can be obtained sintered bodies of $Si_3N_4$ having the theoretical density without requiring an addition of sintering aids.

Sintering temperature may preferably be in the range of about 1800° to 2000° C. and most preferably in the range of about 1850° to 1950° C. The reason for this is that a good high density for sintered bodies can not be obtained at temperatures below 1800° C. and sintering at temperatures exceeding 2000° C. causes decomposition of $Si_3N_4$ and unfavorable grain growth, thereby resulting in a reduced density.

Hereinafter, the present invention will be described in more detail with reference to Examples.

EXAMPLE 1

$\alpha$-$Si_3N_4$ powder was mixed with (1) SiC whiskers with an average diameter of 0.5 $\mu$m and a length of 100 $\mu$m (average aspect ratio: about 200) or (2) SiC whiskers with an average diameter of 0.4 $\mu$m and a length of 25 $\mu$m (aspect ratio: 15-100, average aspect ratio: about 60), in amounts of 30% by weight of the total amount of $\alpha$-$Si_3N_4$ and the SiC whiskers to form a mixture. This mixture is molded into molded bodies. After sealing the molded bodies in Pyrex (Registered Trade Mark) glass the, HIP process was carried out under a pressure of 1800 kg/cm$^2$ at 1900° C. for three hours. The strength and toughness of the sintered bodies thus obtained are given in Table 1. For the purpose of comparison, the properties of a sintered body without addition of SiC whiskers are given in the same table.

TABLE 1

| Addition of whiskers (wt. %) | Average aspect ratio | Toughness (MN/m$^{3/2}$) | Strength (MPa) | Evaluation* |
|---|---|---|---|---|
| 0 | — | 3.0 | 411 | X |
| (1) 30 | 200 | 3.5 | 311 | X |
| (2) 30 | 60 | 5.0 | 607 | ⊚ |

Remark:
⊚: very good results
X: unacceptable results

As can be seen from Table 1, when the SiC whiskers (1) of small aspect ratio were added, the resulting sintered body exhibited a considerable improvement in the strength and toughness. Addition of the SiC whiskers (2) of large aspect ratio resulted in a reduction of strength.

EXAMPLE 2

Using whiskers of SiC having an average aspect ratio of about 60 in amounts as shown in Table 2, sintered bodies were produced under the same processing conditions as described in Example 1 and their hardness, toughness and strength were measured. The results are shown in Table 2. The attached drawing shows the high-temperature characteristics of hardness for the sintered body with addition of 30% by weight of the SiC whiskers in comparison with those of a comparative sintered body free of SiC whiskers.

TABLE 2

| Addition of whiskers (wt. %) | Hardness (GPa) | Toughness (MN/m$^{3/2}$) | Strength (MPa) | Evaluation* |
|---|---|---|---|---|
| 0 | 17.2 | 3.0 | 411 | X |
| 10 | 17.8 | 3.7 | 438 | ◯ |
| 20 | 19.2 | 3.9 | 515 | ◯ |
| 30 | 20.2 | 5.0 | 607 | ⊚ |

Remark:
⊚: very good results,
◯: good results,
X: unacceptable results

As is clear from Table 2, it is confirmed that the sintered bodies of the present invention have improved mechanical properties. Particularly, an addition of 30% by weight of the SiC whiskers is considerably effective in improving the properties. Further, it is evident from the drawing that the mechanical properties at high temperatures can be also improved.

What is claimed is:

1. A method for producing a high strength, $Si_3N_4$ composite having a high density and good strength and toughness properties, said composite being composed of a sintered body free of sintering aids consisting mainly of $Si_3N_4$ and containing SiC whiskers with a small aspect ratio, said method consisting of the steps of mixing SiC whiskers having a small aspect ratio of about 15 to 100 with $Si_3N_4$ powder, with the amount of the SiC whiskers being in a range of 5% to 40% by weight of the sum of the $Si_3N_4$ and said SiC whiskers; molding the mixture into a molded body; sealing the molded body in glass; and then sintering the sealed molded body by a hot isostatic pressing process without using a sintering aid at a temperature in a range of about 1800° to 2000° C.

* * * * *